March 31, 1964　　　G. S. NALLE, JR　　　3,127,298
PLASTIC NETTING EXTRUSION APPARATUS AND
METHOD AND PRODUCTS THEREOF
Filed Sept. 26, 1960　　　　　　　　　　　　4 Sheets-Sheet 1
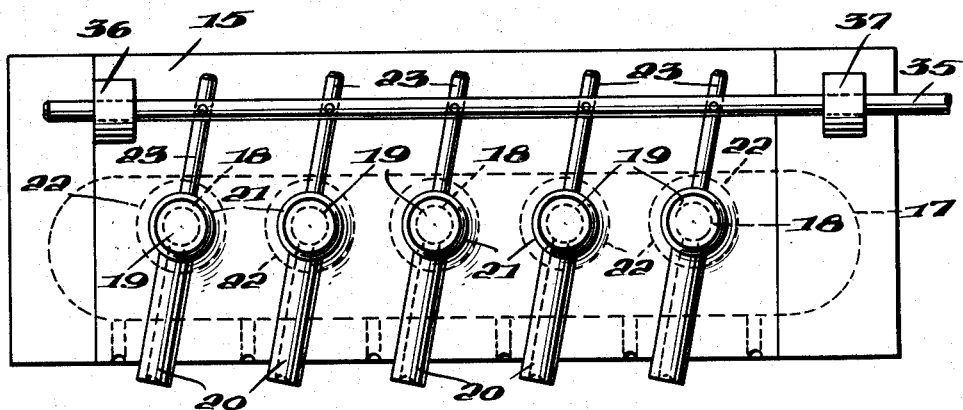
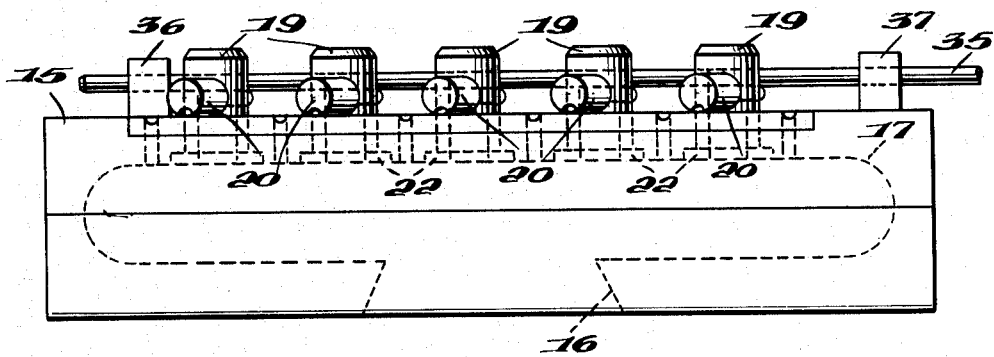
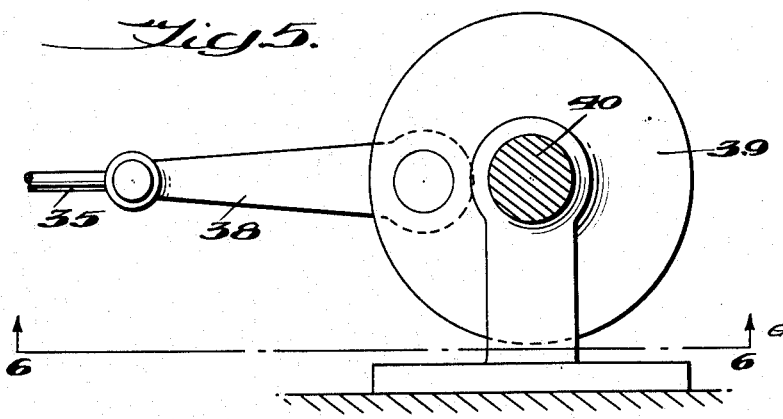
INVENTOR
GEORGE S. NALLE, JR
BY
ATTORNEY March 31, 1964  G. S. NALLE, JR  3,127,298
PLASTIC NETTING EXTRUSION APPARATUS AND
METHOD AND PRODUCTS THEREOF
Filed Sept. 26, 1960  4 Sheets-Sheet 2

INVENTOR
GEORGE S. NALLE, JR.

BY *Philip E. Liggers*
ATTORNEY

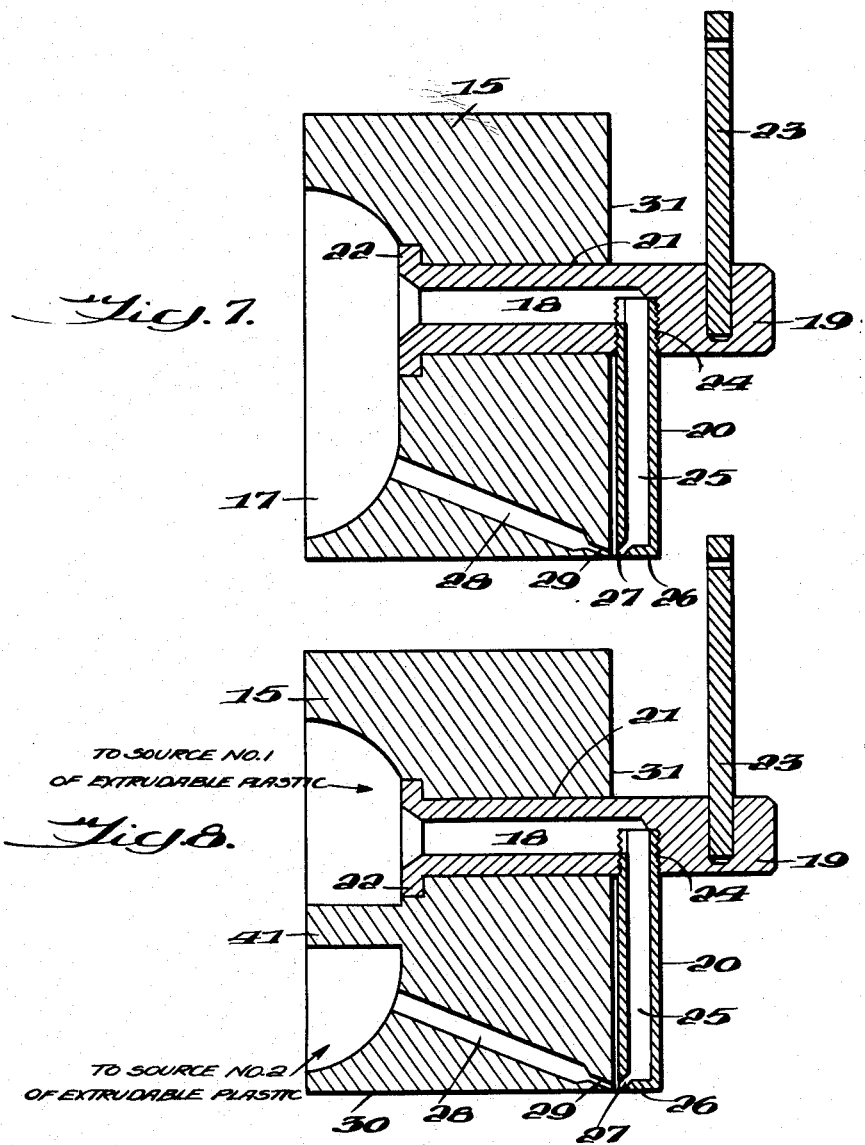

INVENTOR
GEORGE S. NALLE, JR.

BY Philip F. Liggers
ATTORNEY

United States Patent Office 3,127,298
Patented Mar. 31, 1964

3,127,298
PLASTIC NETTING EXTRUSION APPARATUS AND METHOD AND PRODUCTS THEREOF
George S. Nalle, Jr., 108 W. 2nd St., Austin, Tex.
Filed Sept. 26, 1960, Ser. No. 58,409
4 Claims. (Cl. 156—441)

This invention relates to plastic netting extrusion apparatus and methods and to the products thereof. The term "plastic" includes plastic extrudable metal alloys and metalloids as well as resinous plastics. The term "netting" includes not only meshed fabrics made from filaments, and fabrics only partly meshed, but also meshed structures composed of foamed resinous plastic strands.

The present invention is an improvement on the invention disclosed in my application Serial No. 27,662, filed May 6, 1960, now Patent No. 3,019,147, granted January 30, 1962, and the present application may be considered as a companion application to the case just identified.

An object of the invention is to provide a machine which when fed from a source of extrudable plastic material will automatically extrude a plastic netting, or a partially meshed structure, or a meshed structure composed of foamed resinous strands, which is finished except for hardening and cutting to size. A more specific object is to provide a machine of the character indicated which may extrude either a continuous flat netting or, with a rearrangement of parts, a continuous tubular netting. The invention particularly aims to simplify the construction of the machines shown in my companion application identified above. A further object is to provide a method and means for extruding plastic foamed strands and simultaneously forming a netting or meshed structure made of said foamed strands. A still further object is to provide a novel hammock or similar meshed structure, formed in a continuous extrusion process from a single source, or two sources, of resinous plastic material. Other objects will be apparent from the following description of the inventive apparatus and methods and products thereof which are shown in the accompanying partly diagrammatic drawings forming a part of this specification.

In said drawings,

FIG. 1 is a partly diagrammatic view in elevation of a form of apparatus adapted to extrude a flat netting, the operating mechanism being omitted for lack of room on the sheet;

FIG. 2 is a bottom plan view of the apparatus shown in FIG. 1;

FIG. 5 is a side elevation of a power-driven shaft, shaft mounting and connections for operating the machine of FIGS. 1 and 2, or alternatively, that of FIGS. 3 and 4;

FIG. 7 is a detail in vertical section showing the cooperating elements of the machines of FIGS. 1–4, by means of which the extruded filaments are united at regularly spaced intervals to form welded or coalesced strands, as illustrated in FIG. 10; the scale being about full size;

FIG. 8 is a view like FIG. 7 but showing a partition in the plastics chamber to make it possible to extrude simultaneously filaments of two different colors or filaments of two different plastic compositions;

Figure 3:
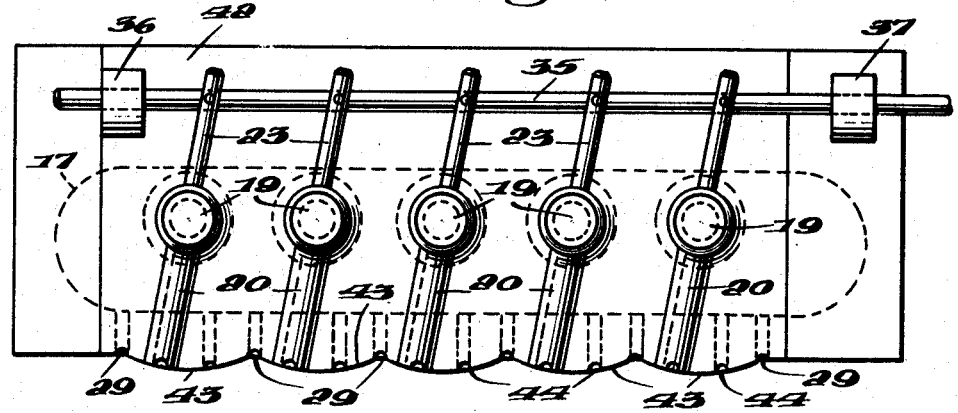
FIG. 3 is a view like FIG. 1, showing a modified form of the apparatus.

Referring particularly to the drawings, and first to FIGS. 1, 2, 5, 6 and 7, the apparatus there shown includes a die head 15, preferably of massive metal to withstand the pressure of the plastic material, having an inlet 16 connected to a source of pressurized plastic material in extrudable condition (not shown). Preferably the die head is split or in two parts, as shown in FIG. 2, to facilitate disassembling for cleaning. The die head 15 may be heated by electric resistance wires or by other means, not shown, to maintain the fluidity of the plastic material until it has been extruded. The plastic material flows from inlet 16 into a chamber 17 provided on the interior of the die head, and from chamber 17 the plastic material flows into the axial passages 18 (FIG. 7) of rotatable pins 19, which as shown in FIGS. 1 and 2 are arranged in a straight row longitudinally of the die head. While only five rotatable pins 19 are illustrated, in an actual machine there may be ten or twenty times as many, or even more. Each rotatable pin serves both as a conduit for the plastic material and as an essential support for an extrusion element or nozzle 20 from which said material is extruded. The pins 19 may be of brass and have a rotating fit in bores 21 provided in the die head 15, and preferably each pin 19 has a flange 22 at one end fitting a counter bore (FIGS. 7 and 8) in the die head. The flanges 22 obviate axial movement of the pins 19 in bores 21 responsive to the highly pressurized plastic. Each pin 19 is rotated on its axis by means of an arm or lever 23 fixed thereto near its outer end and projecting at right angles to said axis. The mechanism for rocking the several arms or levers 23 will be described presently.

The nozzles 20 are cylindrical and are screw threaded or otherwise removably secured to pins 19 as indicated at 24 (FIG. 7). Each nozzle has a straight bore 25 of uniform diameter, the upper end of each bore 25 being open to an axial passage 18 of pin 19, while the lower end of each bore is closed by a wall 26. An extrusion opening 27 is provided in each wall 26 and extends at an angle so that the extreme lower (outer) end of the opening 27 intersects the circular edge where the outer surface of wall 26 meets the cylindrical outer walls of nozzle 20. It will be appreciated that nozzles 20 do not have to be cylindrical throughout their lengths: they may be partly hexagonal or have outer walls of other form to facilitate screwing on and unscrewing from the pins 19 which carry them. The extrusion openings 27 may be as small as 1 micron in diameter or may be as large as 1/16 in. or even larger.

Drilled through the wall of the die head 15 is a bore 28 which provides an extrusion passage, with a finer bore 29 extending to the straight edge where the lower wall 30 of the die head meets the side wall 31 thereof. It may be said that this straight edge bisects the fine bores 29. Nozzles 20, as oscillated by pins 19, swing very close to the side wall 31 and momentarily during each swing in either direction each nozzle 20 is in the position illustrated in FIG. 7, wherein its extrusion opening 27 is juxtaposed to the extrusion passage 29. This in conjunction with the pressure on the plastic causes a welding or coalescing of the plastic filaments, which afterwards separate as the nozzle swings away, to form the open meshes of the netting. See FIG. 10.

Figure 6:
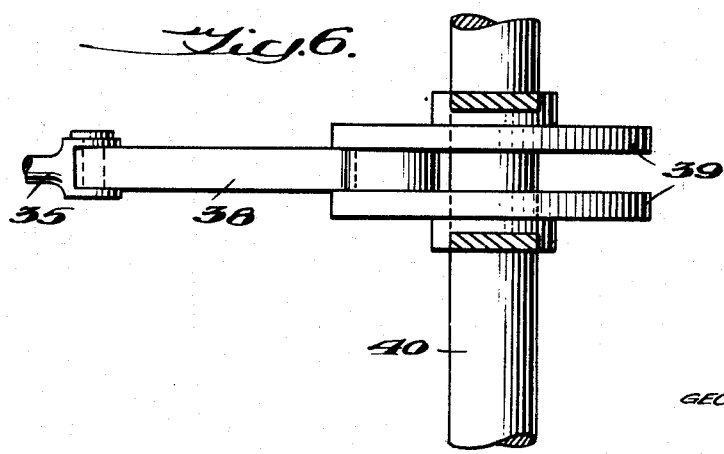
FIG. 6 is a section on line 6—6 of FIG. 5, looking in the direction of the arrows.

One of the many possible forms of actuating mechanisms for the nozzles is shown in FIGS. 1, 5 and 6. The several levers 23 are each pivotally connected at their upper ends to a rod 35 which is supported by and reciprocates in bearings 36, 37 fixed to the die head. These bearings are shown diagrammatically. At one end rod 35 is pivotally connected to a crank arm 38 which in turn is pivotally connected to a crank disk 39 fixed to a power-driven shaft 40. The means to drive the shaft is not shown, but it will be understood that said means must be under the control of the operator, who controls the size of the meshes by controlling the speed of shaft 40. In lieu of a crank and crank disk, a cam drive may be employed (not shown).

Referring to FIG. 8, the parts are the same as in FIG. 7 except for the partition 41 extending the length of chamber 17, an arrangement which makes it possible to feed plastic materials from two different sources (not shown) to the sets of extrusion openings 27, 29. Thus the meshes may be of two different colors or may be of two different plastic materials welded together as at W, FIG. 10. The feeding of plastics of two different characteristics to mesh-forming extrusion passages is described in my pending application Serial No. 837,732, filed September 2, 1959, hence is not shown here.

Figure 4:
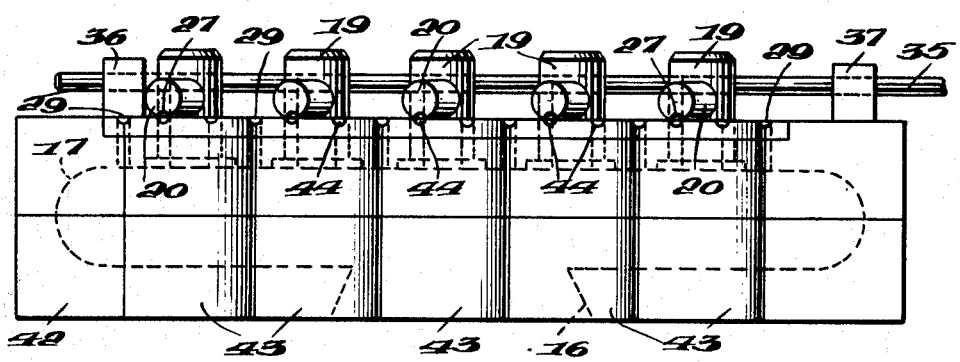
FIG. 4 is a bottom plan view of the apparatus of FIG. 3.

Referring to FIGS. 3 and 4, the apparatus there shown is exactly like the embodiment illustrated in FIG. 1 except that the die head 42 has arcuate or bulbous extensions or flutings 43 directly below each rotatable pin 19, the arc of each of these flutings having its center in the axis of the corresponding pin 19. One or more extrusion passages 44 are provided in the arcuate extensions, said passages 44 being supplied with plastic material from the chamber 17, exactly as the extrusion openings 29 are supplied. Thus as the nozzles 20 swing, they form a weld W at each end of each swing and also form welds at each point where an extrusion passage 44 occurs. This arrangement makes for a larger number of meshes per linear foot of netting than is possible with the apparatus of FIGS. 1 and 2.

Figure 9:
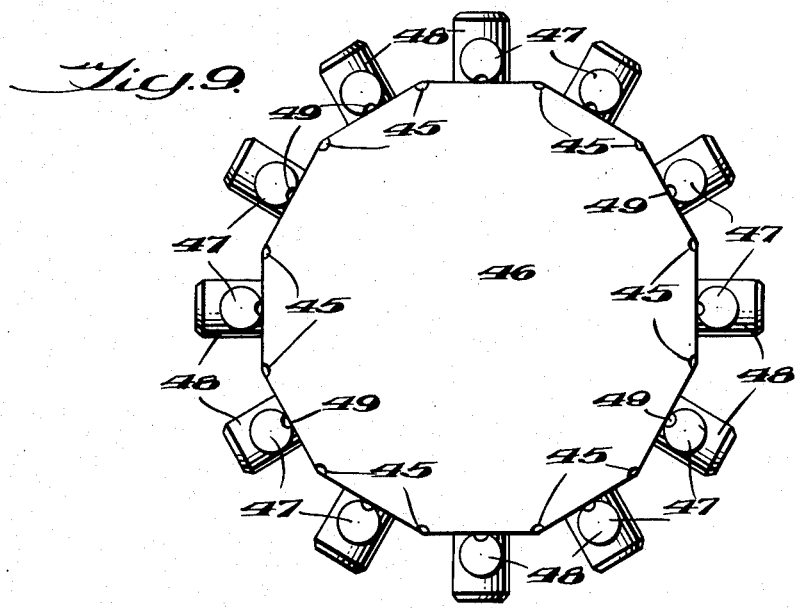
FIG. 9 is a diagrammatic bottom plan view of an arrangement in the form of a dodecagon for extruding plastic nettings having a continuous generally tubular form.

The two forms of apparatus so far described will extrude a "flat" netting, that is, a netting which if laid on a flat surface will lie flat on that surface. It is frequently desirable to provide a continuous tubular netting. This may be done by the arrangement diagrammatically shown in FIG. 9, wherein a set of stationary extrusion openings 45 are provided at the twelve corners of a die head 46 which is a dodecagon. It will be understood that the die head 46 may have eighteen, twenty-four or any other convenient number of sides. Nozzles 47 are carried on rotatable pins 48, which are like pins 19, and are swung back and forth by a mechanism to be described, each nozzle 47 at each end of its swing bringing its extrusion opening 49 into registry with a corner extrusion opening 45, thereby forming a weld like the welds W, FIG. 10. The length of these welds is controlled by the length of the pause at the end of each swing or oscillation of the nozzles 47. Additional stationary extrusion openings may be provided in the die head 46 between each pair of corner extrusion openings 45, so that more meshes per linear foot of netting will be formed.

The nozzles 47 may be oscillated by means of a mechanism similar to that shown in FIGS. 7 and 8 of my application Serial No. 27,662, filed May 9, 1960, said mechanism comprising an oscillatory ring surrounding the die head and having universal joint connections with arms (like levers 23) which are fixed to the rotatable pins carrying the nozzles. The ring may be oscillated about the axis of the die head by means of a crank arm and crank disk (FIGS. 5 and 6) or by a cam arrangement (not shown) driven by a power shaft under the control of the operator.

The invention so far described is believed to be an important improvement over the apparatuses disclosed in my application Serial No. 27,662, because the mechanisms here disclosed are so much simpler, yet will produce the same type of plastic netting at the same production rate, or better.

Figure 10:
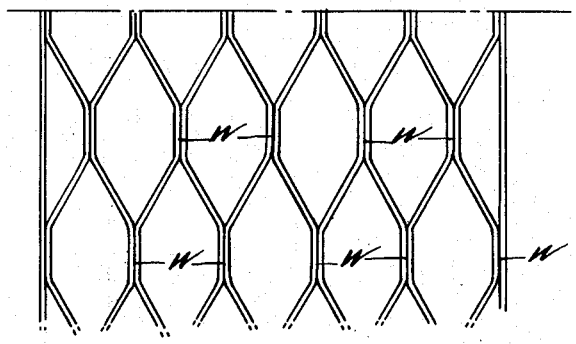
FIG. 10 is a fragmentary plan view of a meshed plastic netting such as might be made by the apparatus of FIGS. 1 and 2.

The described machines may be operated to produce a netting like that of FIG. 10 with a fringe at each end composed of a multiplicity of double strands like the welds W in FIG. 10. To make a fringe, the machine need only be operated so as to stop the oscillation of the pins 19 at the precise point where the extrusion openings 27 of the pins 19 register with the extrusion openings 29, see FIGS. 7 and 8. If the machines are used to extrude an inherently strong plastic material such as polystyrene, the article extruded may have a fringe at each end with a meshed structure like FIG. 10 extending between the fringed ends.

The fringed ends may be several feet long and may be united by a spreader (not shown, but known in hammock construction) and tied or bound together at their ends and attached to suitable hardware; the whole forming a strong hammock or similar article which is a unitary extrusion except for the spreader and hardware. The hammock's appearance would be greatly enhanced by using two colors of plastic materials welded together, as described above. A hammock of this nature is believed to be broadly new and is so claimed.

The present invention also comprehends a novel method and a novel product of that method, as will now be described.

Figure 11:
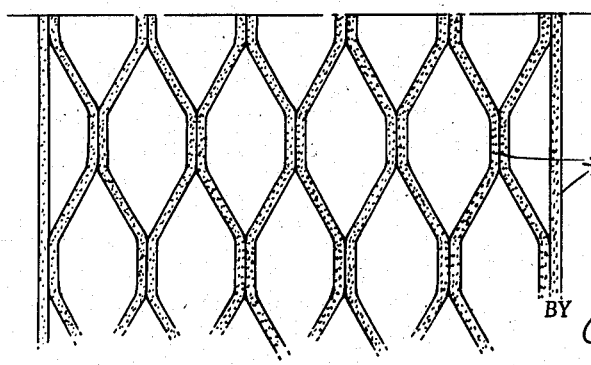
FIG. 11 is a fragmentary plan view of a meshed netting made of a foamed plastic, as could be made by the apparatus of FIGS. 1 and 2 is supplied with a foamable plastic material.

By employing a source of pressurized foamable plastic material (not shown) such as foamed polyethylene, foamed polystyrene, foamed vinyl, foamed isocyanates, etc., any of the described machines may be employed to extrude a continuous unitary netting 50 whoses meshes are made of foamed plastic strands. See FIG. 11. A foamed netting of this character may weigh as little as 2.25 ounces per square yard or less. Such a netting structure would be useful in reinforcing certain textile or plastic manufacturers; for example, draperies, portieres for room entrances, etc. As the foamed netting structure may be translucent, and of almost any color, or even of two colors, it may be combined with similar or dissimilar fabrics to give them more "body" without adding materially to their weight, and without detracting from the appearance of the principal fabric. A bulky foamed netting may be useful as a cushion padding under carpets and rugs.

Either of the described meshed structures (FIGS. 10 and 11) may be adapted for use as an ornamental hanging for dividing rooms or areas while permitting light and air to pass therethrough. Also as coverings for walls, ceilings, etc., of arenas, stages, etc., the described meshed structures, especially if of two colors, may considerably enhance the appearance of the areas covered, especially if natural or artificial light is permitted to play on the hangings, etc. Thus interior decorators will have a novel material to employ in their work.

While I have described the apparatus and other aspects of the invention in considerable detail, it will be understood that I am not limited to these details, but only by the appended claims, which fairly define the invention.

What is I claim is:

1. Apparatus for extruding in one operation a unitary netting of plastic material comprising, in combination, a source of pressurized plastic material; a hollow die head connected to said source to receive said plastic material on its interior; a plurality of spaced nozzles all of which are swingably mounted on the outside of the die head and are constructed and arranged to receive the plastic material from the interior of said die head, each of said nozzles being adapted to discharge the plastic material as a continuous extruded running length; power-actuated means to swing said nozzles simultaneously back and forth through a limited arc; the die head having a plurality of spaced stationary extrusion passages adapted to discharge the plastic material from the interior of the die head as a plurality of continuous extruded running lengths, each stationary extrusion passage being so spaced relative to the other stationary passages as to be coincident with a nozzle and be closely adjacent thereto at each end of the swing of each of said nozzles; each nozzle having an extrusion opening which registers with a stationary extrusion passage at the end of each swing so that the extrudates are welded together at the end of each swing of each nozzle, but without crossing.

2. The invention defined in claim 1, wherein the die head has walls symmetrically disposed about a central axis, and the nozzles are mounted for oscillation on said walls, said nozzles being spaced equal distances from said central axis, and being disposed equiangularly about said axis; the stationary extrusion passages being at equal distances from the central axis and spaced equiangularly about said axis; the extent of swing of said nozzles being equal to the spacing between each adjacent pair of stationary extrusion passages.

3. The invention defined in claim 2, wherein the walls of the die head in cross section form a polygon and the oscillatory nozzles are mounted on said die head to swing closely adjacent each of the side walls of the polygon; certain ones of the stationary extrusion passages being located and discharging their extrudates at the corners where the walls of the polygon meet the bottom wall of the die head.

4. In combination, a die head having a hollow chamber on its interior adapted to receive a pressurized plastic material; a set of hollow pins adapted to receive said plastic material from the interior of said die head; means to mount said pins on said die head so that the pins are rotatable on their axes; a power-actuated mechanism connected to said pins to rotate said pins simultaneously throught a limited arc in either direction about their axes; a nozzle fixed to each of the pins to move in an oscillating manner through an arc determined by the arc of movement of the pins and receiving plastic material therefrom; said nozzles each having an extrusion opening at the discharge end; the die head having stationary extrusion passages equal in number to the extrusion openings of the nozzlees, the nozzle extrusion passages registering with the stationary extrusion passages at the end of each swing in either direction of each nozzle to cause the extrudates to weld together at the moments such registering takes place.

References Cited in the file of this patent

UNITED STATES PATENTS

| | | |
|---|---|---|
| 1,515,263 | Matsusaki | Nov. 11, 1924 |
| 2,268,160 | Miles | Dec. 30, 1941 |
| 2,502,514 | Ewer | Apr. 4, 1950 |
| 2,850,467 | Livingood | Sept. 2, 1958 |
| 2,907,096 | Halbig | Oct. 6, 1959 |
| 2,919,467 | Mercer | Jan. 5, 1960 |

FOREIGN PATENTS

| | | |
|---|---|---|
| 182,336 | Japan | Mar. 16, 1950 |
| 4,139 of 1950 | Japan (Addition to No. 182,336) | Nov. 30, 1950 |